(No Model.)

C. TANGENBERG.
FLOUR BIN.

No. 498,526. Patented May 30, 1893.

Witnesses:
J. Halpenny
R. B. Cooper

Inventor:
Christiaan Tangenberg,
By his attorneys,
Gridley & Hopkins

UNITED STATES PATENT OFFICE.

CHRISTIAAN TANGENBERG, OF CHICAGO, ILLINOIS.

FLOUR-BIN.

SPECIFICATION forming part of Letters Patent No. 498,526, dated May 30, 1893.

Application filed September 26, 1892. Serial No. 446,920. (No model.)

*To all whom it may concern:*

Be it known that I, CHRISTIAAN TANGENBERG, a citizen of the United States, residing at Chicago, in the county of Cook and State of Illinois, have invented certain new and useful Improvements in Flour-Bins, of which the following is a specification, reference being had to the accompanying drawings, which are made a part hereof, and in which—

Figure 1:
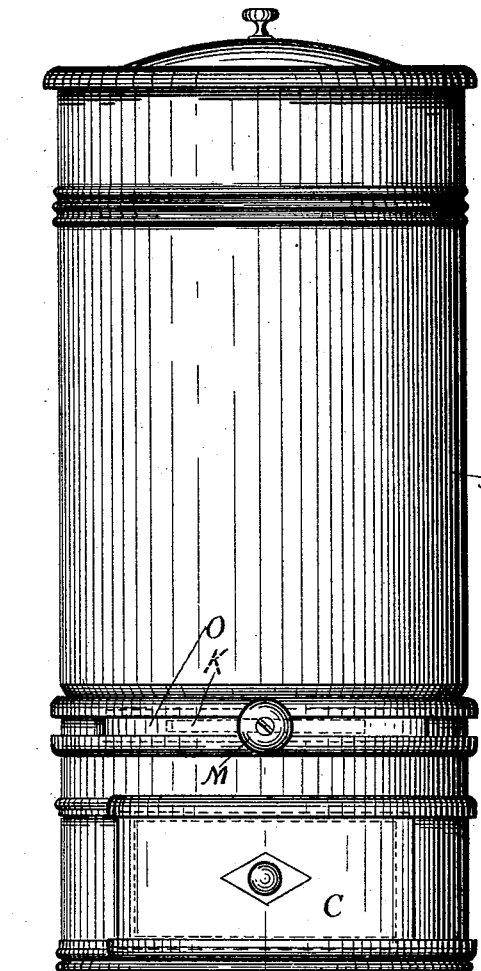
Figure 2:
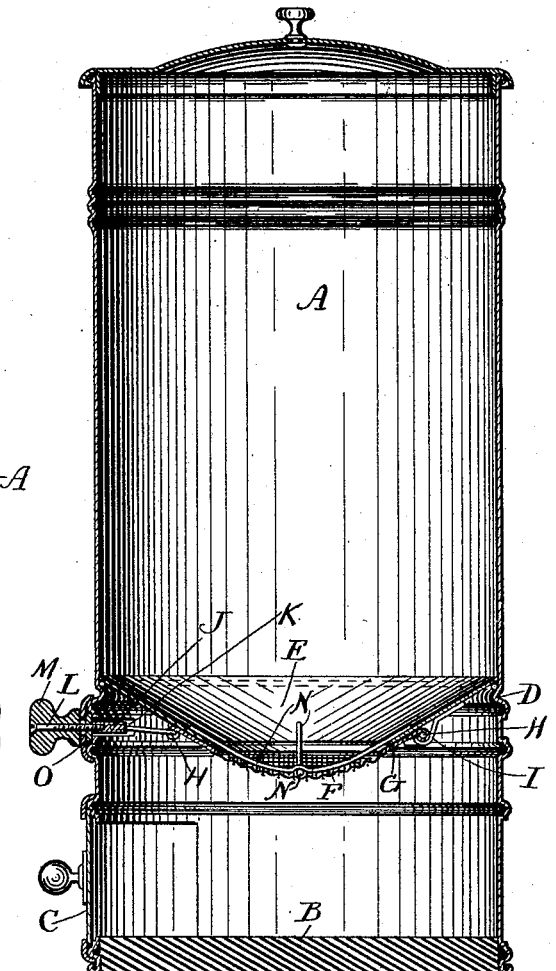
Figure 3:
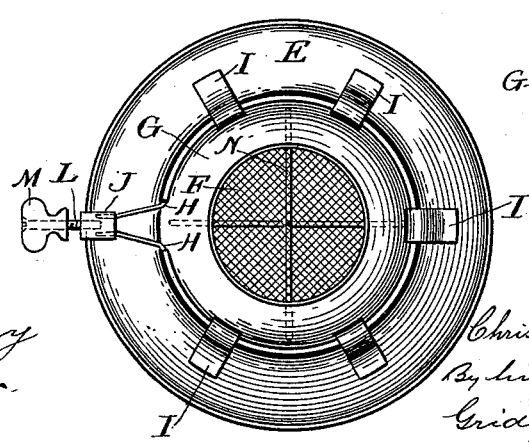
Figure 4:
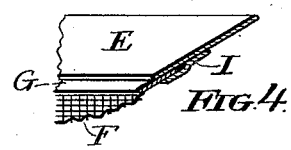

Figure 1, is a front elevation of a flour bin, embodying the invention. Fig. 2 is a vertical section thereof. Fig. 3, is an under side view of the sifting mechanism. Fig. 4, is a fragmentary view, showing, in vertical section, a slight modification.

The present invention relates to a bin or receptacle that is intended for holding flour, meal, and similar substances, and which is provided, some distance above the bottom proper, with a "false bottom," which includes a sieve, mechanism being provided for agitating the material and thereby facilitating its sifting through the sieve and into the compartment below, from which it is removed through an opening provided for that purpose.

I have heretofore, to wit: on the 7th day of June, 1892, obtained a patent for a device of this character, and the object of the present invention is to improve, simplify, and cheapen the means used in such a device for agitating the material and thus facilitating the sifting, and to this end, the said invention consists in certain features of novelty, that are particularly pointed out in the claims hereinafter.

In the drawings, A represents a bin or receptacle, that may be of any desired shape and material, but I prefer to make it cylindrical and of sheet metal. It is provided with a bottom B, and near this bottom with an opening through which any material that falls upon the bottom can be removed, a door C being provided for closing the opening. Some distance above the bottom, the receptacle is provided with an internal bead or shoulder D, which is preferably formed by forcing inward a portion of the material of which the receptacle is made—where it is made of sheet metal. Upon this shoulder rests loosely, so as to be removable, a false bottom, comprising an annular portion E, which is preferably made of sheet metal and of hopper-shape, and a piece F, of wire gauze, or other reticulated material covering the central opening of the annulus E, and acting as a sieve, through which the flour or other material may be sifted. So far, I have described nothing new, as all of these features are found in the device shown and described in my patent above referred to, to-wit: No. 476,430, dated June 7, 1892.

Instead of securing the sieve fixedly to the other portion of the false bottom, as shown and described in said patent, according to the present invention, it is secured so as to be movable, and a suitable handle is provided for moving it. As shown in the drawings, it is secured, by soldering, or in any other suitable way, to a sheet metal ring G, which is of such shape that it fits snugly against the under side of the tapering sheet metal portion E, of the false bottom, and to the under side of this ring, at its outer edge, is secured a wire H, which serves to strengthen the ring, and in conjunction with the plates I, it serves as a means of guiding the ring in its movements. These plates I, are secured to a portion E, of the false bottom, and their outer ends are bent so as to embrace the wire H, and hold it against lateral displacement, while permitting it to move about the axis of the ring.

The wire may be secured in any desired way, but I prefer to first spin the edge of the sheet metal around, or partially around it, and then solder it, but since the object is simply to form a strengthening bead on the outer edge of the ring, any other suitable construction may be adopted. Indeed, the bead may, if desired, be omitted entirely, in which case the plates I, would be made each with a simple offset, as shown in Fig. 4. The ends of the wire do not meet in a complete ring, but are carried outward in converging planes, and are secured to a block J, which lies quite close to the wall of the bin, and directly opposite a horizontal slot K, through which passes a screw L, which is screwed into the block and carries a handle or knob M. If this knob be moved from side to side, acting through the medium of the connections thus described, the sieve will be oscillated back and forth, about an axis passing through its own center, and since the flour or other material is resting directly upon it, its movement will cause the flour to sift through. In order to still further facilitate the sifting, I secure to the top side of the portion E, of the false bottom, one or more wires N, which rest upon the upper surface of the sieve, or else lie very close to it, and serve as agitators.

In order to cover the slot K, I secure to the knob, or to the screw stem, a slide O, of sufficient length to cover the slot, and in order to hold said slide in place, guide it in its movement, and reduce the area of contact between it and the outer surface of the bin to a minimum.

I follow the construction shown, described and claimed in my patent aforesaid, for mounting the door.

Having thus described my invention, what I claim as new therein, and desire to secure by Letters Patent, is—

1. In combination, a receptacle having a bottom comprising the imperforate ring E and a rotary sieve, the wire H secured to the sieve and having ends extending outward therefrom, the block J located within the receptacle and attached to the outer ends of the wire, a handle secured to said block, and the plates I secured to the ring E and supporting the sieve, substantially as set forth.

2. In combination, a receptacle having a bottom comprising the removable imperforate ring E and a rotary sieve, the plates I secured to the ring E and supporting the sieve, the block J, means connecting said block with the sieve, and a handle located upon the outside of the receptacle and removably attached to the block, substantially as set forth.

CHRISTIAAN TANGENBERG.

Witnesses:
L. M. HOPKINS,
N. C. GRIDLEY.